(12) United States Patent
Hinton

(10) Patent No.: US 6,782,565 B2
(45) Date of Patent: Aug. 31, 2004

(54) PORTABLE LAVATORY APPARATUS

(76) Inventor: Susan P. Hinton, 7680 Dune Dr., New Orleans, LA (US) 70128

(*) Notice: Subject to any disclaimer, the term of this patent is extended or adjusted under 35 U.S.C. 154(b) by 0 days.

(21) Appl. No.: 10/366,140

(22) Filed: Feb. 13, 2003

(65) Prior Publication Data

US 2003/0167563 A1 Sep. 11, 2003

Related U.S. Application Data

(63) Continuation-in-part of application No. 10/091,808, filed on Mar. 6, 2002, now abandoned.

(51) Int. Cl.[7] .............................................. A47K 11/06
(52) U.S. Cl. ...................... 4/484; 4/483; 4/239; 4/254
(58) Field of Search ........................ 4/484, 483, 239, 4/254; 297/130, 344.18, 54

(56) References Cited

U.S. PATENT DOCUMENTS

| | | | |
|---|---|---|---|
| 612,076 A | 10/1898 | Weston | |
| 1,419,947 A | 6/1922 | Schouten | |
| 1,781,938 A | 11/1930 | Zundel | |
| 3,235,884 A | 2/1966 | Rehsteiner | |
| 3,381,315 A | 5/1968 | Glassberg | |
| 4,930,165 A | 6/1990 | Wilson | |
| 5,090,063 A | 2/1992 | Edwards et al. | |
| 5,765,236 A | * 6/1998 | Bethanis | 4/237 |
| 5,852,832 A | * 12/1998 | Voigt et al. | 4/237 |
| 6,000,068 A | 12/1999 | Chavis | |
| 6,256,800 B1 | * 7/2001 | Isbit | 4/254 |
| 6,341,386 B1 | 1/2002 | Phillips et al. | |

FOREIGN PATENT DOCUMENTS

DE 3239059 A 10/1982

* cited by examiner

Primary Examiner—Gregory L. Huson
Assistant Examiner—Khoa Huynh
(74) Attorney, Agent, or Firm—Adams and Reese LLP

(57) ABSTRACT

A multi-function portable lavatory apparatus is provided that may be used as a self-supporting portable seat in conjunction with a conventional toilet, as well as a minimal contact portable seat in conjunction with portable bathroom facilities that typically comprise a fixed toilet seat mounted directly upon a waste holding tank

9 Claims, 8 Drawing Sheets

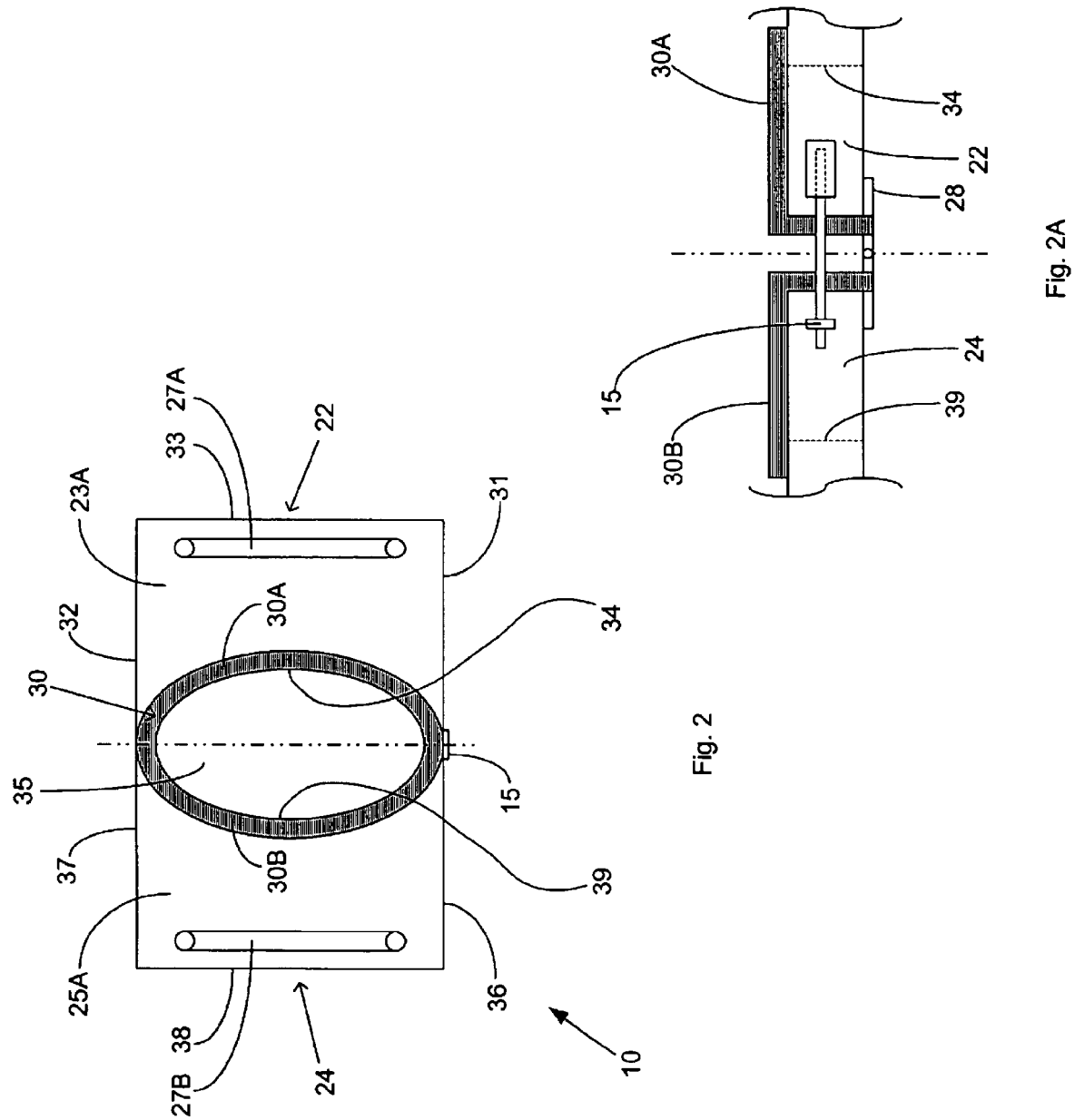

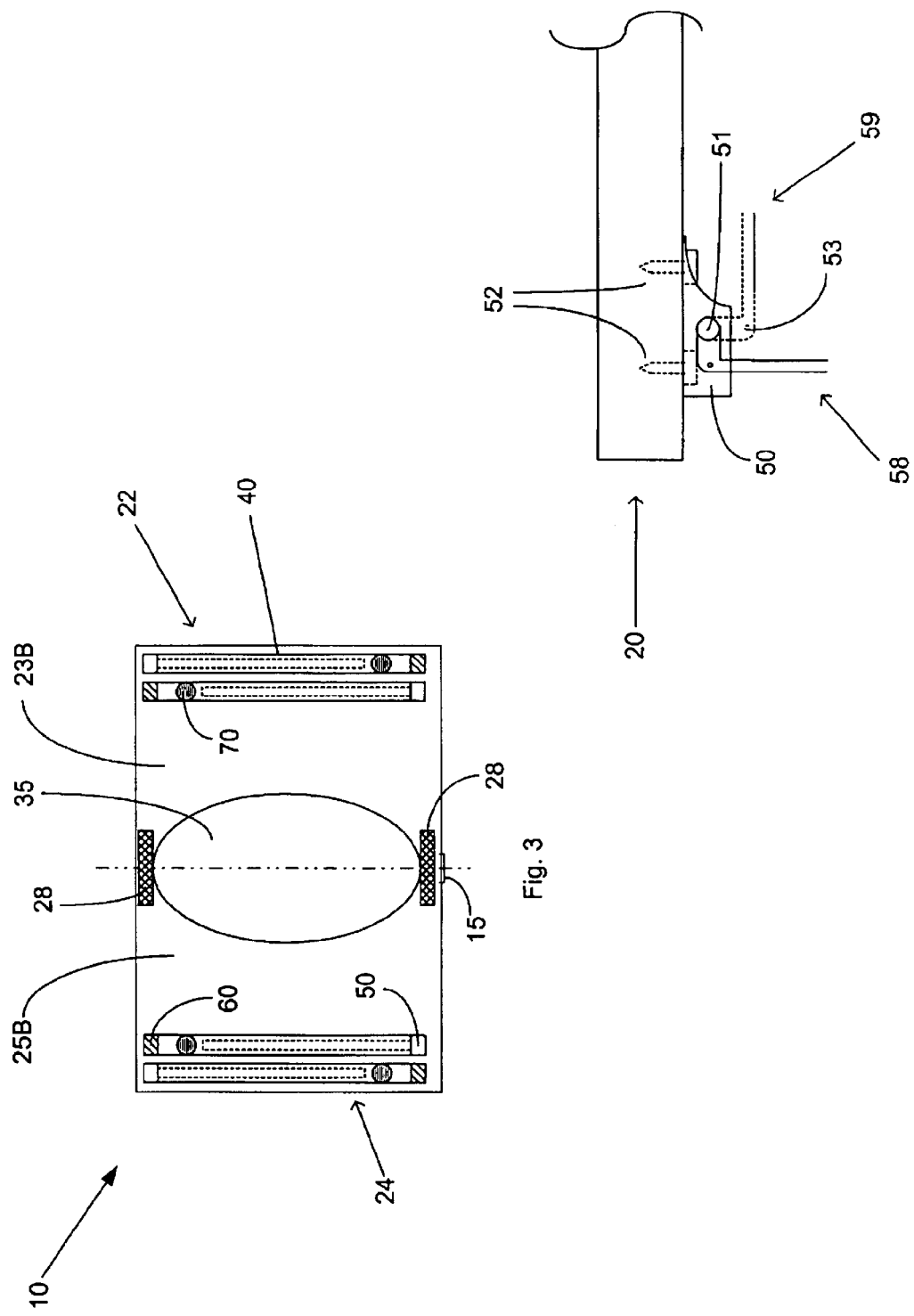

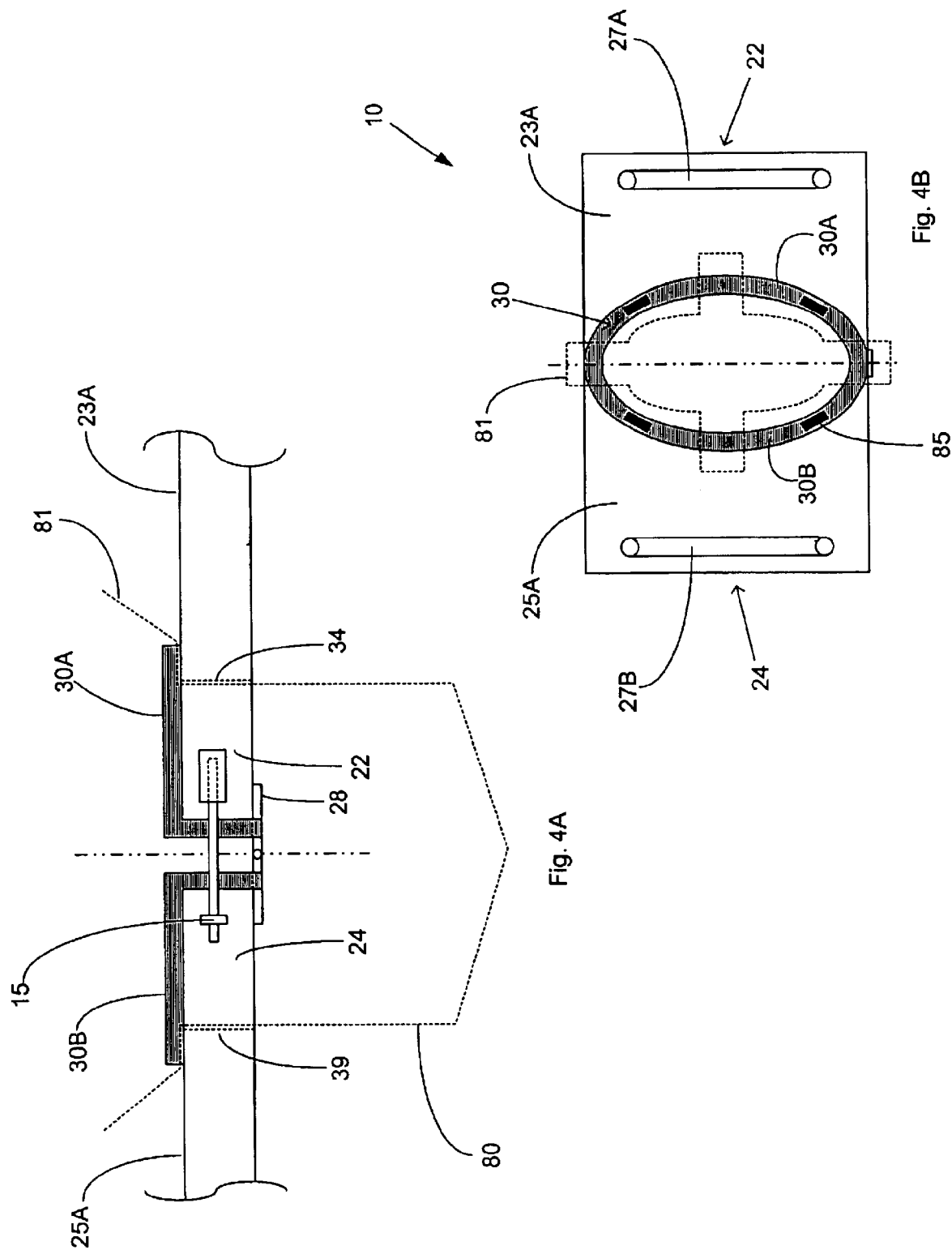

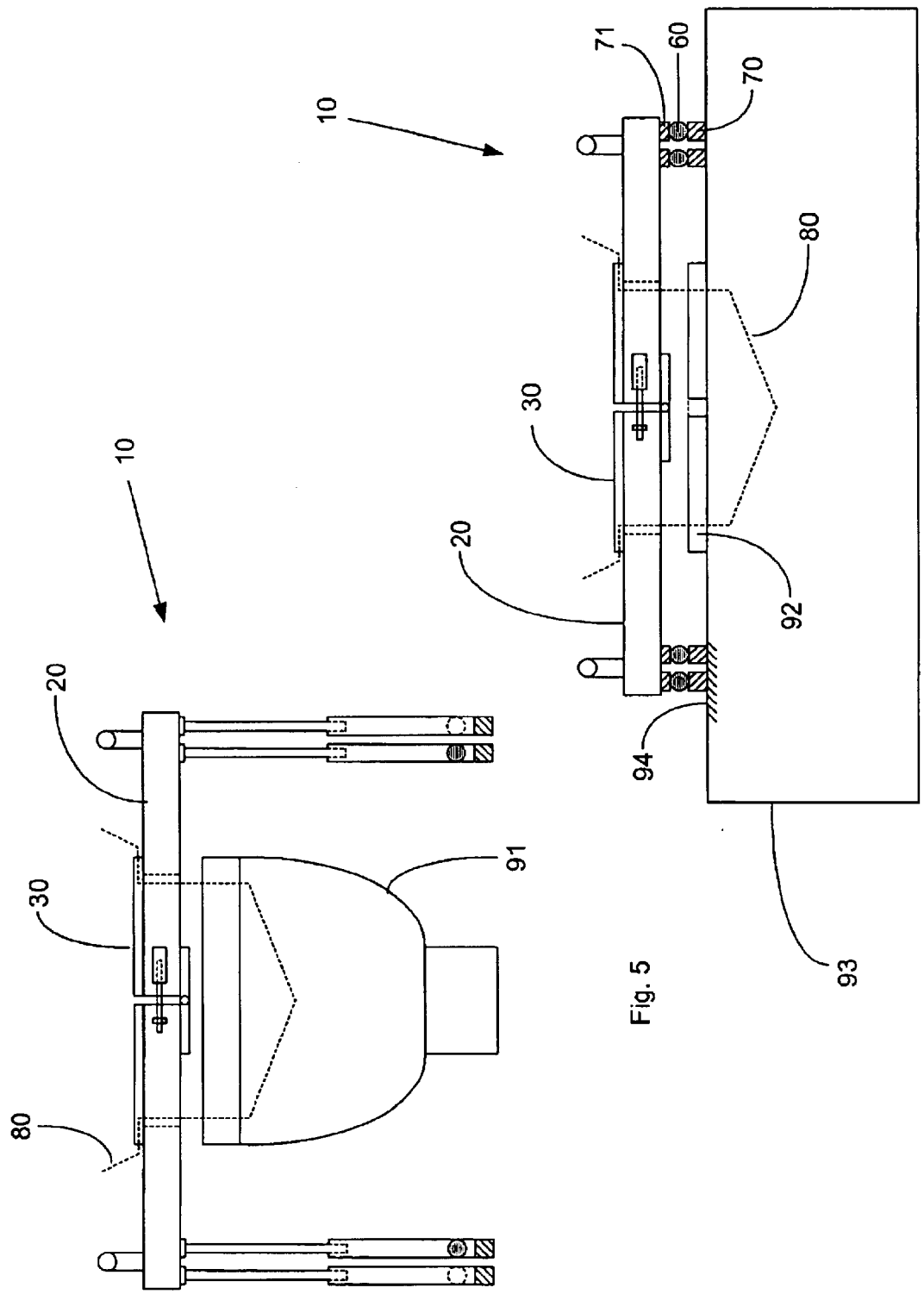

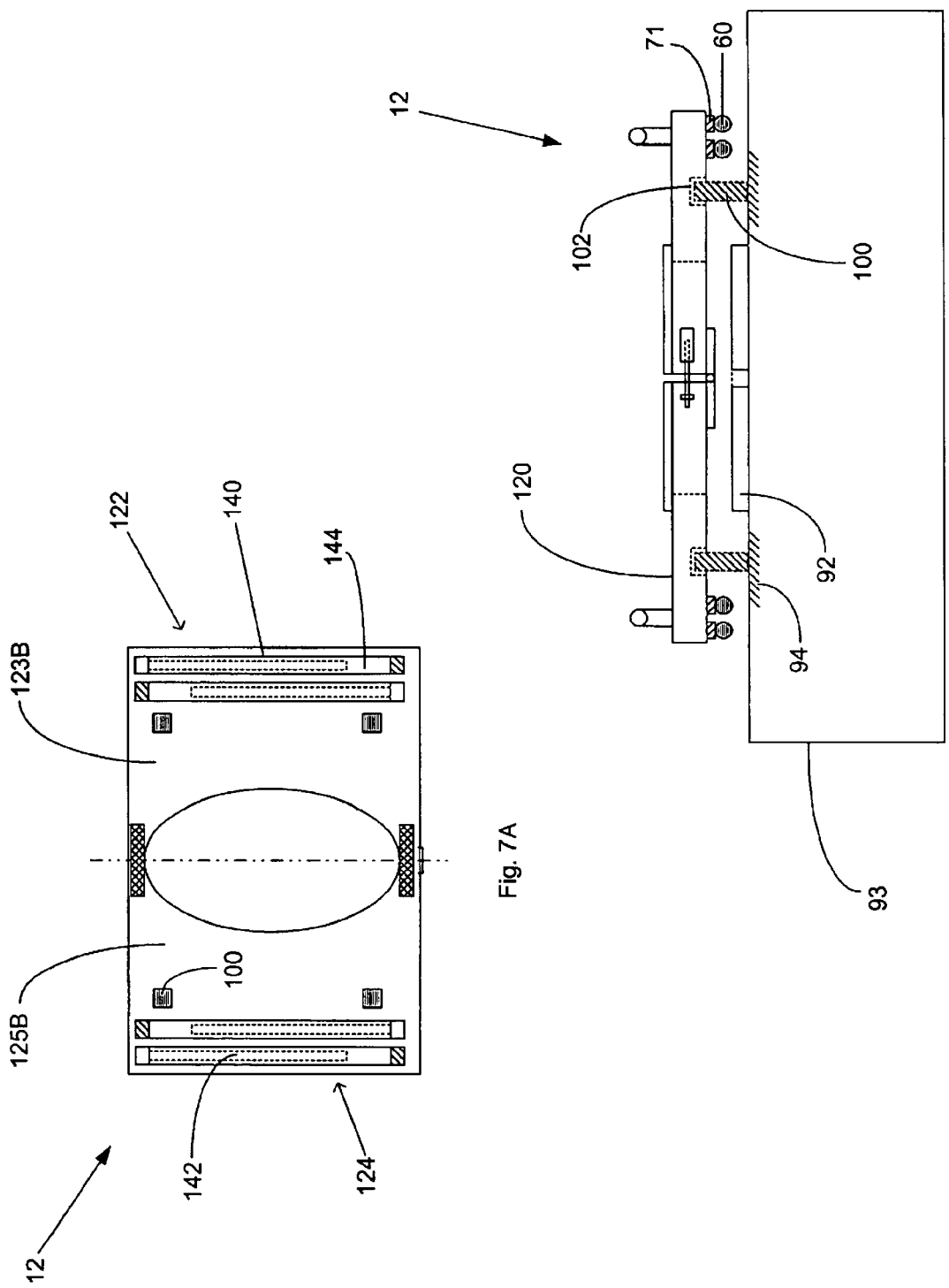

PORTABLE LAVATORY APPARATUS

This is a continuation-in-part of U.S. patent application Ser. No. 10/091,808 filed on Mar. 6, 2002 now abandoned.

STATEMENT REGARDING FEDERALLY SPONSORED RESEARCH OR DEVELOPMENT

Not Applicable

FIELD OF THE INVENTION

The present invention relates to a portable toilet seat. More specifically, the invention relates to a multi-function portable toilet seat that may be used as a self-supporting portable seat in conjunction with a conventional toilet, as well as a minimal contact portable seat in conjunction with portable bathroom facilities that typically comprise a fixed toilet seat mounted directly upon a waste holding tank, particularly in situations when the user is either handicapped or of relatively large stature.

BACKGROUND OF THE INVENTION

Public restrooms are generally found in a condition in which the general public cannot depend upon the cleanliness of the facility. This is particularly true for portable bathroom facilities utilized at campgrounds or during outdoor events, as well as other situations where a large number of people are expected to use the facility and routine cleaning of the facility does not take place.

Public restrooms that employ conventional toilet bowls often supply paper toilet seat covers that a user may employ to avoid direct contact with the conventional toilet seat. However, if the conventional toilet seat is wet, the paper toilet seat covers offer minimal protection against contamination.

In some circumstances, such as during outdoor events or in remote areas including campgrounds and the like, the only bathroom facility available for use comprises a portable restroom facility in which a conventional toilet seat is mounted directly upon a waste holding tank. These types of facilities are often extremely unsanitary and the paper linings described above would not insulate the user from contamination of the surface of the waste holding tank as the paper linings are only designed to cover the toilet seat mounted on the tank. This is particularly true for users of large stature for whom which bodily contact with the surface of the holding tank may be unavoidable.

The prior art offers several attempts to overcome problems associated with the unsanitary conditions of public restroom facilities employing conventional toilet bowls and seats, however, most of the prior art only disclose seats that must make some type of contact with the seat provided by the public facility. While these types of portable seats insulate the user's body from direct bodily contact with an unsanitary surface, contamination of the portable seat cannot be avoided. Prior art portable seats that are self-supporting and do not make contact with the conventional seat provided by the public facility may prevent contamination of the portable seat, but they are not adaptable for use in portable bathroom facilities in which the conventional seat is mounted directly on a waste holding tank. Further, the support mechanisms of the prior art portable seats do not offer stable support for use in these types of portable bathroom facilities, particularly for users of large stature.

Additionally, the portable bathroom facilities described above are often not equipped with appropriate handrails to aid a handicapped user. In this instance, a handicapped user would be forced to use the potentially contaminated surface of the waste holding tank in order to secure a position upon the conventional toilet seat of the portable bathroom facility. Prior art portable seats do not address this concern.

Accordingly, one preferred embodiment of a portable lavatory apparatus for use in conjunction with public restroom facilities is provided comprising, generally, a planar member having an opening and a top and bottom surface, a plurality of telescoping support members extending from the bottom surface of the planar member, each having a pair of non-skid footings. The non-skid footings are oriented in such a way as to allow the first non-skid footing to engage the floor of a public restroom facility when the telescoping support members are in the open position and the apparatus is used in conjunction with a conventional toilet bowl and to allow the second non-skid footing to engage the surface of the waste holding tank when the telescoping support members are in the closed position and the apparatus is used in conjunction with a portable bathroom facility.

Another preferred embodiment of a portable lavatory apparatus is provided comprising, generally, a planar member having an opening and a top and bottom surface, a plurality of telescoping support members extending from the bottom surface of the planar member, each having a non-skid footing for engagement with the floor of a public restroom facility when the telescoping support members are in the open position, and a plurality of interchangeable, disposable support members, also extending down from the bottom surface of the planar member, for engagement with the surface of a waste holding tank when the apparatus is used in conjunction with a portable restroom facility.

The planar member of the present invention may be foldable in addition to the collapsible telescoping support members, thus enhancing portability. The portable lavatory apparatus may include a permanently installed or removable seat cushion, and a locking mechanism to prevent inadvertent folding of the planar member. Handrails maybe installed on the top surface of the planar member for use of the apparatus by handicapped individuals. Finally, a biodegradable waste containing splashguard may be employed to prevent user contact with contaminated waste water within a conventional toilet or waste holding tank.

BRIEF DESCRIPTION OF THE DRAWINGS

FIG. 2 is a top view of one preferred embodiment of a portable lavatory apparatus of the present invention.

FIG. 2A is an exploded view of the seat of one preferred embodiment of a portable lavatory apparatus of the present invention, featuring a segmented seat cushion.

FIG. 3 is a bottom view of one preferred embodiment of a portable lavatory apparatus of the present invention, featuring multi-function extendable legs in the retracted position.

FIG. 4A is an exploded front-side view of the central portion of a portable lavatory apparatus of the present invention, featuring a disposable splashguard.

FIG. 4B is a top-side view of the portable lavatory apparatus and disposable splashguard shown in FIG. 4A.

FIG. 5 is a front-side view of one preferred embodiment of a portable lavatory apparatus of the present invention installed above a conventional toilet bowl.

FIG. 6 is a front-side view of one preferred embodiment of a portable lavatory apparatus of the present invention installed above the waste holding tank of a portable bathroom facility.

FIG. 7A is a bottom view of another preferred embodiment of a portable lavatory apparatus of the present invention, featuring interchangeable, disposable support members.

FIG. 7B is a front-side view of the portable lavatory apparatus illustrated in FIG. 7A installed above the waste holding tank of a portable bathroom facility.

PREFERRED EMBODIMENTS OF THE INVENTION

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

Figure 1:
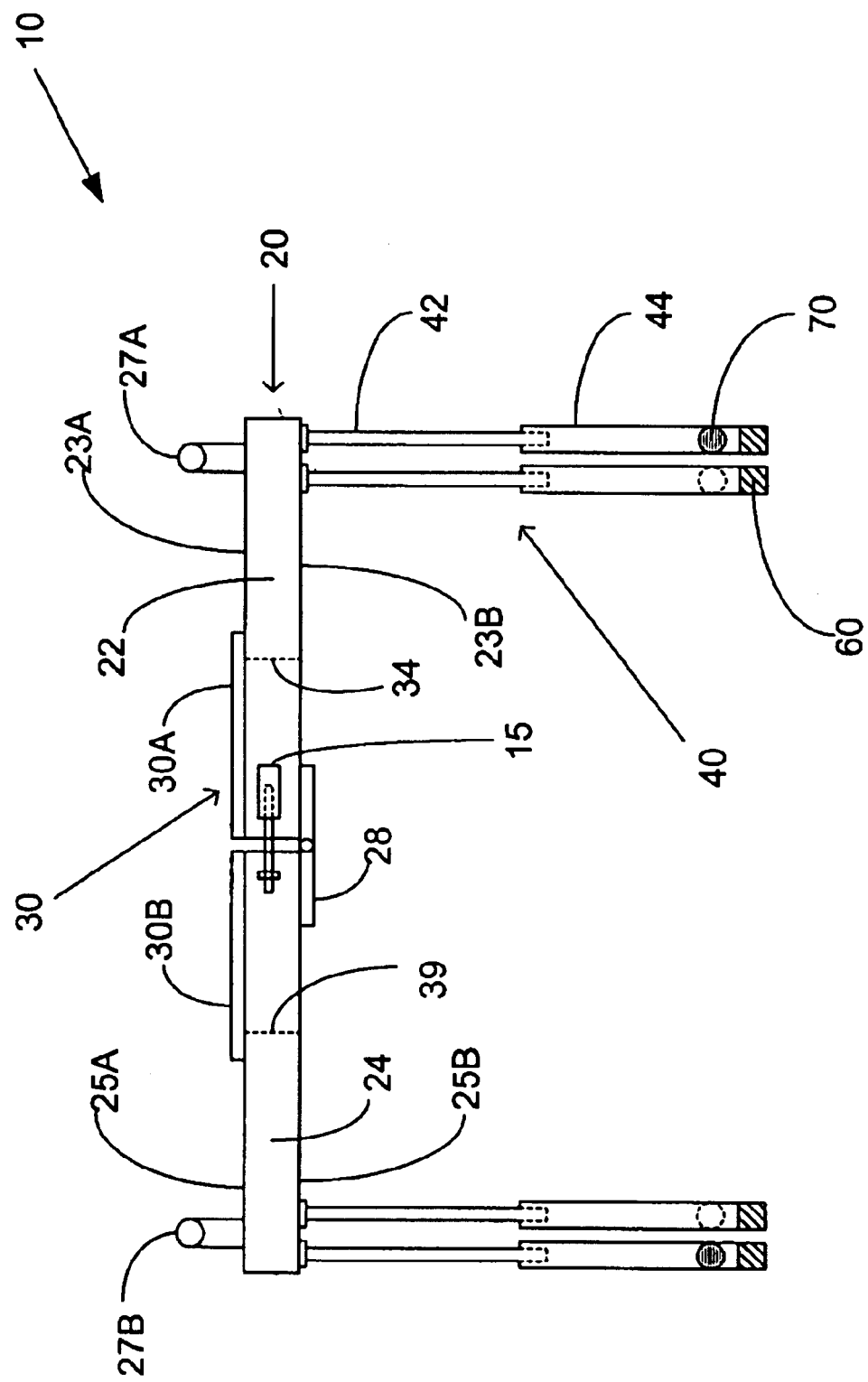
FIG. 1 is a front-side view of one preferred embodiment of a portable lavatory apparatus of the present invention.

FIG. 1 illustrates one preferred embodiment of the portable lavatory apparatus 10 of the present invention. The structure of apparatus 10 comprises, generally, a base 20 having a right hand segment 22 and a left hand segment 24. The segments 22, 24 of base 20 may be constructed of wood, plastic or any other suitable material. Right hand segment 22 and left hand segment 24 both have an upper surface 23A, 25A and a lower surface 23B, 25B. Right hand segment 22 includes handrail 27A that is fixedly attached to upper surface 23A. Similarly, left hand segment 24 includes handrail 27B fixedly attached to upper surface 25A. On the lower surfaces 23B, 25B of right hand segment 22 and left hand segment 24, a plurality of multi-function legs extend therefrom, with each multi-function leg being generally referred by the numeral 40. Each leg 40 generally comprises an upper telescoping section 42 and a lower telescoping section 44, wherein the upper telescoping section 42 is confined within the lower telescoping section 44.

FIG. 2 illustrates the general shape of right hand segment 22 and left hand segment 24. Right hand segment 22 includes front edge 31, back edge 32, outer edge 33 and inner edge 34. Similarly, left hand segment 24 includes front edge 36, back edge 37, outer edge 38, and inner edge 39. As shown in FIG. 2, front edges 31, 36, back edges, 32, 37, and outer edges 33, 38 of right hand segment 22 and left hand segment 24 have substantially linear design. However, the substantially linear design may be replaced with an arcuate design, in order to make apparatus 10 more aesthetically pleasing to the user. It should be noted that front edges 31, 36 and back edges 32, 37 are of sufficient length to provide a user of apparatus 10 a stable foundation, which does not require bodily contact any potentially contaminated surface of a public restroom facility or portable restroom facility. The preferred length of edges 31, 32, 36, 37 is about 10 to about 20 inches, which results in a total length of about 20 to about 40 inches for base 20. Inner edge 34 of right hand segment 22 and inner edge 39 of left hand segment 24 are curved in such a way as to define an opening 35 upon the mating of right hand segment 22 and left hand segment 24. The opening 35 defined by inner edges 34, 39 may be round, oval, or any other desired shape.

FIG. 2 also shows seat cushion 30, having right portion 30A and left portion 30B, secured to upper surfaces 23A, 25A of base 20. Right and left portions 30A, 30B of seat cushion 30 maybe permanently secured to base 20 with an adhesive compound or may be fixedly secured by means of screws, snaps, locks, hook and loop fabric, or any other type of fasteners. The interface between seat cushion 30 and base 20 may be limited to upper surfaces 23A, 25A, or, alternatively, the interface between seat cushion 30 and base 20 may extend across upper surfaces 23A, 25A and through opening 35 defined by inner edges 34, 39, as shown in FIG. 2A. Seat cushion 30 may be constructed of rubber, foam, or any other suitable material.

FIG. 3 is a bottom view of apparatus 10 showing the lower surfaces 23B, 25B of right hand segment 22 and left hand segment 24. As seen in FIG. 3, right hand segment 22 is mated to left hand segment 24 by means of a pair of conventional folding hinges 28, which permit the lower surface 25B of left hand segment 24 to fold upon the lower surface 23B of right hand segment 22. Locking mechanism 15 (best seen in FIG. 1) prevents movement of hinges 28 when right hand segment 22 and left hand segment 24 are in the open position. Locking mechanism 15 may be disposed across front edges 31, 36, across back edges 32, 37, or across both front edges 31, 36 and back edges 32, 37. FIG. 3 also shows the plurality of multi-function legs 40 in their retracted and folded position.

Multi-function legs 40 are secured to base 20 by means of fastener plate 50. As shown in FIG. 3A, fastener plate 50 is secured to base 20 with screws 52 or other similar device. Fastener plate 50 comprises a rotating pin assembly 51 that permits the multi-function legs 40 to be folded from its open position 58 to its closed position 59 against the lower surfaces 23A, 25A of base 20. The upper telescoping section 42 of multi-function leg 40 is secured by rotating pin assembly 51 and includes a conventional dimple lockout 53 that prevents inadvertent closure of rotating pin assembly 51.

Figure 1A:
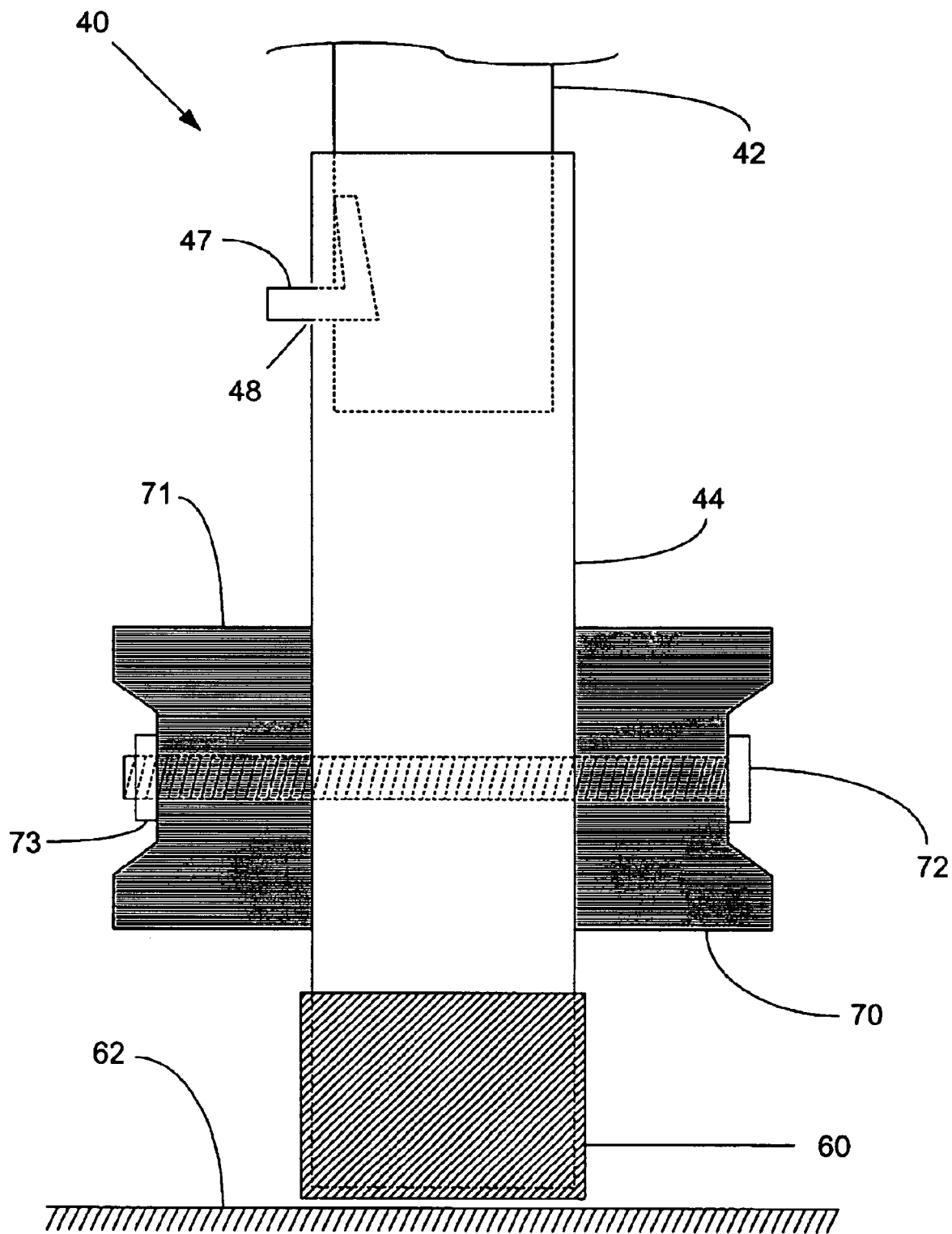
FIG. 1A is an exploded view of a multi-function extendable leg.
Figure 1B:
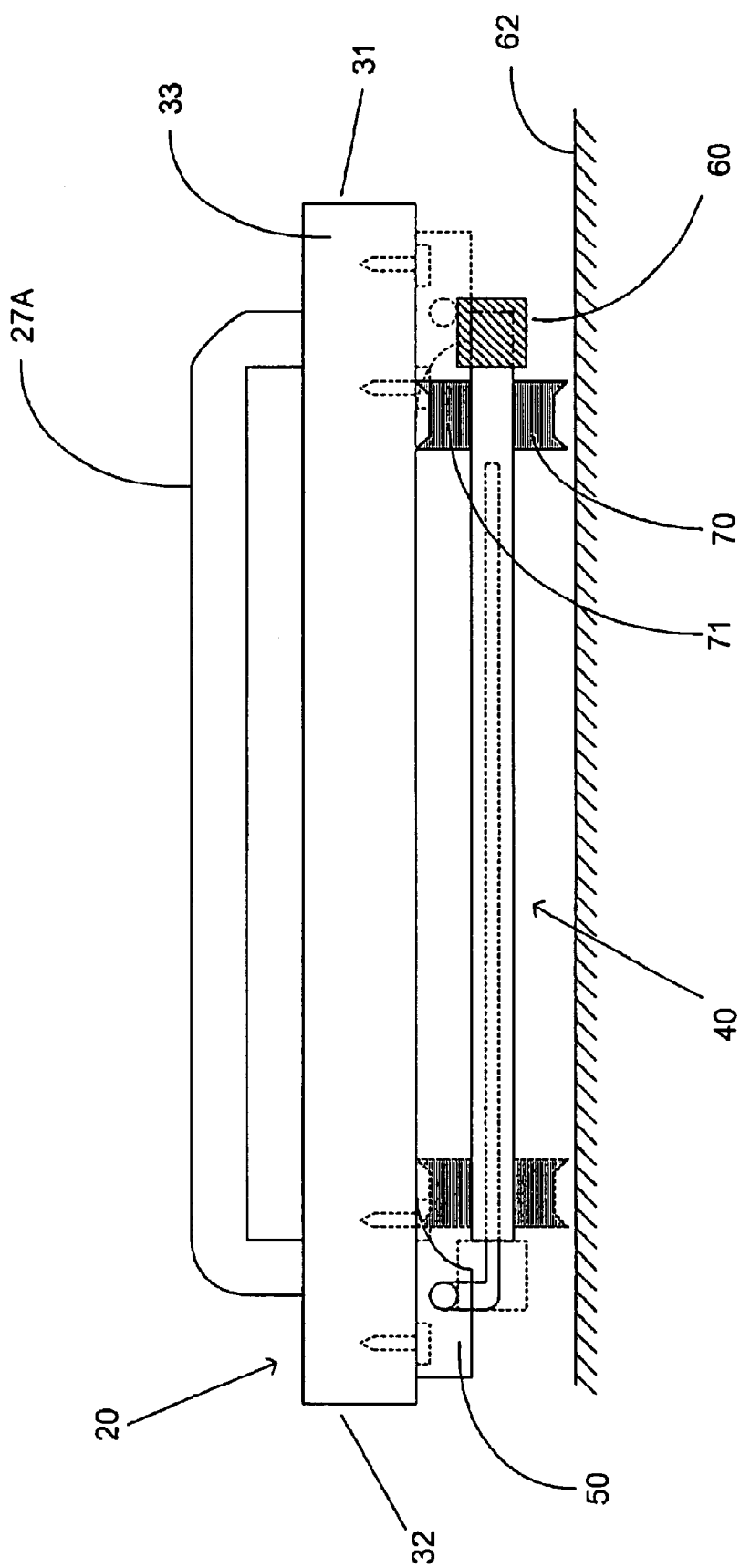
FIG. 1B is a right-side view of one preferred embodiment of a portable lavatory apparatus of the present invention, featuring a multi-function extendable leg in the closed position.

FIGS. 1A and 1B show detailed views of multi-function legs 40. FIG. 1A is an exploded view of a multi-function extendable leg 40 comprising an upper telescoping section 42 confined within a lower telescoping section 44. The two telescoping sections 42, 44 may be secured by conventional means such as a locking collar, which may be turned to engage the upper and lower telescoping sections 42, 44 and effectively lock the lower telescoping section 44 in a fixed position relative to the upper telescoping section 42. Alternatively, the two telescoping section 42, 44 may be secured by retractable pins 47 disposed within the upper telescoping section 42 that secure within receiving holes 48 disposed along lower telescoping section 44.

The lower telescoping section 44 terminates within a non-skid footing 60, as shown in FIG. 1A, which engages a surface 62 when the multi-function extendable leg 40 is in an open position. When the leg 40 is in a closed position, as shown in FIG. 1B, non-skid footing 70 engages a surface 62. Chock 71 engages the lower surface 23B of base 20 and supports multi-function extendable leg 40 in the closed position, which provides a stable foundation for user's of apparatus 10. This arrangement is particularly advantageous when apparatus 10 is employed in conjunction with portable bathroom facilities comprising a conventional toilet seat mounted directly upon a waste holding tank. Both chock 71 and non-skid footing 70 are secured to lower telescoping section 44 by bolt 72 and lock nut 73.

FIGS. 4A and 4B illustrate another preferred embodiment of the portable lavatory apparatus of the present invention. FIG. 4A provides an exploded front-side view of the central portion of a portable lavatory apparatus 10. Seat cushion 30, having right portion 30A and left portion 30B, is shown having an interface with base 20 that extends along upper surfaces 23A, 25A and through opening 35 defined by inner edges 34, 39. As best seen in FIG. 4B, seat cushion 30 is secured to base 20 by means of conventional hook and loop fabric strips 85. Splashguard 80 is shown displaced within opening 35 and held in place by the positioning of seat cushion 30. Splashguard 80 comprises, generally, a biodegradable container having elongated tab portions 81 that are sandwiched between seat cushion 30 and base 20. The elongated tab portions 81 are positioned such that they lie between the hook and loop fabric strips 85 securing seat cushion 30 to base 20. Use of splashguard 80 prevents a user of apparatus 10 from bodily contact with splashed contaminated water that may reside within the conventional toilet bowl of a public restroom facility or within the waste holding tank of a portable restroom facility.

The employment of apparatus 10 in conjunction with a conventional toilet bowl 91 and in conjunction with a conventional toilet seat 92 mounted upon a waste holding tank 93 is shown in FIGS. 5 and 6, respectively. As shown in FIG. 5, splashguard 80 prevents user contamination in conjunction with a conventional toilet bowl 91. It should be noted that there is no contact between apparatus 10 and the conventional toilet bowl 91. In order to dispose of the waste contained by splashguard 80, the user simply releases the hook and loop fabric strips 85 securing seat cushion 30 to base 20 and splashguard 80, along with the waste, is deposited within the conventional toilet bowl 91. Similarly in FIG. 6, splashguard 80 prevents user contamination in conjunction with a conventional toilet seat 92 mounted upon a waste holding tank 93. It should be noted that the only contact made between apparatus 10 and the portable bathroom facility is the interface between non-skid footing 70 and the surface 94 of waste holding tank 93. Waste contained by splashguard 80 is disposed in the same manner as described above.

FIGS. 7A and 7B illustrate another preferred embodiment of the portable lavatory apparatus 12 of the present invention. As shown in FIG. 7A, the portable lavatory apparatus 12 comprises, generally, a base 120 having a right hand segment 122 and a left hand segment 124. The segments 122, 124 of base 120 may be constructed of wood, plastic or any other suitable material. Right hand segment 122 and left hand segment 124 both have an upper surface 123A, 125A and a lower surface 123B, 125B. Right hand segment 122 includes handrail 127A that is fixedly attached to upper surface 123A. Similarly, left hand segment 124 includes handrail 127B fixedly attached to upper surface 125A. On the lower surfaces 123B, 125B of right hand segment 122 and left hand segment 124, a plurality of telescoping legs extend therefrom, with each leg being generally referred by the numeral 140 and are constructed and capable of being rotated into a closed position similar to the legs 40 of apparatus 10 illustrated in FIGS. 1 and 3A. Each leg 140 generally comprises an upper telescoping section 142 and a lower telescoping section 144, wherein the upper telescoping section 142 is confined within the lower telescoping section 144. In addition to the plurality of telescoping legs 144, a plurality of interchangeable, disposable support members 100 also extend from the lower surfaces 123B, 125B of right hand segment 122 and left hand segment 124.

FIG. 7B shows a front view of apparatus 12 employed in conjunction with a waste holding tank 93 of a portable bathroom facility. Base 120 is held above the surface 94 of waste holding tank 93 via a plurality of interchangeable, disposable support members 100. Support members 100 are secured into recessed portions 102 of base 120. Support members 100 may be manufactured of plastic, rubber or any other suitable material and maybe disengaged from recessed portions 102 and discarded after apparatus 12 has been used, thus maintaining the sanitary condition of apparatus 12. Like apparatus 10, apparatus 12 may also employ foldable hinges, locking mechanisms, seat cushions, biodegradable disposable splashguards and handrails as described above in connection with apparatus 10.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. A portable lavatory apparatus for use in conjunction with a portable bathroom facility having conventional toilet seat secured directly upon the surface of a waste holding tank, said portable lavatory apparatus comprising:

a planar member having an opening therein and having a top surface and a bottom surface, the bottom surface comprising four recessed portions;

four telescoping support members extending from the bottom surface of the planar member, each of the four telescoping support members comprising
 a lower telescoping section having a top end and a bottom end, the bottom end of the lower telescoping section comprising a non-skid footing,
 an upper telescoping section in communication with the lower telescoping section, the upper telescoping section capable of moving into at least one position relative to the lower telescoping section, and
 a means for securing the upper telescoping section in the at least one position relative to the lower telescoping section;

four hinge mechanisms securing the four telescoping support members to the bottom surface of the planar member, the four hinge mechanisms capable of allowing the four telescoping support members to rotate from a perpendicular open position to a parallel closed position relative to the planar member; and four rigid support members secured within and extending perpendicularly from the four recessed portions of the bottom surface of the planar member such that when the portable lavatory apparatus is used in conjunction with the portable bathroom facility the four rigid support members engage the surface of the waste holding tank preventing contact with the conventional toilet seat secured thereupon.

2. The portable lavatory apparatus of claim 1, wherein the planar member further comprises a right hand segment, a left hand segment, and at least one hinge mechanism securing the right hand segment to the left hand segment, the hinge mechanism capable of allowing the right hand segment to be folded into a closed position upon the left hand segment.

3. The portable lavatory apparatus of claim 2, wherein the planar member further comprises at least one locking mechanism preventing the planar member from folding into the closed position.

4. The portable lavatory apparatus of claim 1, wherein the planar member further comprises a cushioning surface disposed around the opening upon the top surface.

5. The portable lavatory apparatus of claim 4, wherein the cushioning surface is temporarily secured to the top surface of the planar member such that the cushioning surface may be temporarily removed from the top surface.

6. The portable lavatory apparatus of claim 5, wherein the cushioning surface is temporarily secured to the top surface of the planar member by means of a plurality of hook and loop fabric strips.

7. The portable lavatory apparatus of claim 5, further comprising a biodegradable waste containing splashguard, said splashguard comprising a central waste containing portion and a plurality of substantially rectangular tab portions extending radially from the central waste containing portion, the substantially rectangular tab portions being sandwiched between the cushioning surface and the top surface of the planar member.

8. The portable lavatory apparatus of claim 1, wherein the planar surface further comprises a plurality of handrails secured to the top surface.

9. The portable lavatory apparatus of claim 1, wherein the four rigid support members are detachably secured within the four recessed portions such that the rigid support members may be discarded after use.

* * * * *